Figures 1, 2, 3, 4:
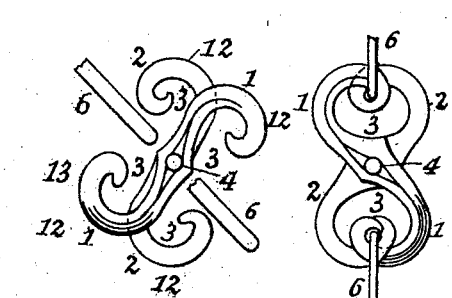

No. 775,038. PATENTED NOV. 15, 1904.
J. HOLMS, JR.
COUPLING LINK.
APPLICATION FILED SEPT. 22, 1903.
NO MODEL.

Witnesses:
E. B. Bolton
N. M. Kuehne

Inventor:
James Holms Jnr
By Richards
his Attorneys.

No. 775,038.                                        Patented November 15, 1904.

UNITED STATES PATENT OFFICE.

JAMES HOLMS, JR., OF WAIMAHAKA, NEW ZEALAND.

COUPLING-LINK.

SPECIFICATION forming part of Letters Patent No. 775,038, dated November 15, 1904.

Application filed September 22, 1903. Serial No. 174,218. (No model.)

*To all whom it may concern:*

Be it known that I, JAMES HOLMS, Jr., farmer, of Waimahaka, Southland, New Zealand, have invented certain new and useful Improvements in Coupling-Links, of which the following is a specification.

This invention provides a simple interlocking coupling without springs which is easily and quickly attached to rings, links, and the like and which is secure whether the chains or the like attached to it are loose or taut. The peculiar formation of the parts of the coupling and the hooked ends thereof give them a tendency to immediately lock on the links and the like when the strain is made on the chain, and this tendency also exists when the chain becomes slack slowly or suddenly. The coupling is thus secure in the case of a sudden jerk or a sudden slackening. The hooked pieces forming the coupling are made of such a shape as to be reversible, so that when worn they may be interchanged, thus increasing the durability of the couplings. All points of the coupling are turned inward and all external faces are rounded, so that adjacent objects will not be caught by it.

The invention consists of the features and combination and arrangement of parts hereinafter described with reference to the accompanying drawings, in which—

Figure 1 is a plan view of the invention under strain. Fig. 2 is a side view of same. Fig. 3 shows the coupling opened for the insertion of the links or hooks of a chain. Fig. 4 is a plan view of the invention not under strain.

There are two S-shaped pieces 1 and 2, with one face of each flat and the other rounded, pivotally secured by a pivot-pin 4 to each other, so that the flat faces may turn on each other. The extreme ends 3 3 of each hook 12 are bent into a V shape for a short distance, and they have tapered points 13. These tapered points 13 meet or just cross when the strain is on the coupling-link, as in Fig. 1. The V-shaped ends 3 3 act as guides for a ring or link to enter into the coupling, as in Fig. 3. They also prevent the ring or link from leaving after it has entered. A slight strain draws two corresponding ends of the coupling together, as in Fig. 4, over the ring or link, and the full strain brings the coupling into the shape illustrated in Fig. 1. If a slackness takes place, the hooks spread outward, while the V-shaped ends 3 3 draw together and grip the ring, as in Fig. 4. The V-shaped ends 3 3 also prevent the ring from moving toward the pivot-pin, as this movement would open the hooks and let the link out. The hooks 12 and the extreme ends 3 3 thereof are so formed that when they are in the position shown in Fig. 1 a heart-shaped space is left, affording just sufficient clearance for the ring or link to be moved round in it. This prevents too much play, which would tend to open the hooks when jolting or jerking of the coupling takes place.

Having now described my invention, what I claim as new, and desire to secure by Letters Patent, is—

1. A link comprising two similar S-shaped members pivotally connected at their middle points, the ends of said members crossing each other and each being thence extended inwardly with its extreme end being directed toward the extreme end of the other member.

2. A link comprising two similar S-shaped members having their inner faces flat, pivotally connected at their middle points the ends of said members being tapered and curved inwardly so as to cross each other and having their extreme ends directed toward each other.

3. A link consisting of two members pivoted to each other at their center and having their ends curved so as to overlap and form a closed opening, their extreme ends being bent into said opening so as to contact with each other at approximately the center of said opening.

In witness whereof I have hereunto set my hand in presence of two witnesses.

JAMES HOLMS, JR.

Witnesses:
  A. J. PARK,
  J. R. PARK.